S. T. Lamb.
Harvester Rake.
N° 30330          Patented Oct. 9, 1860.
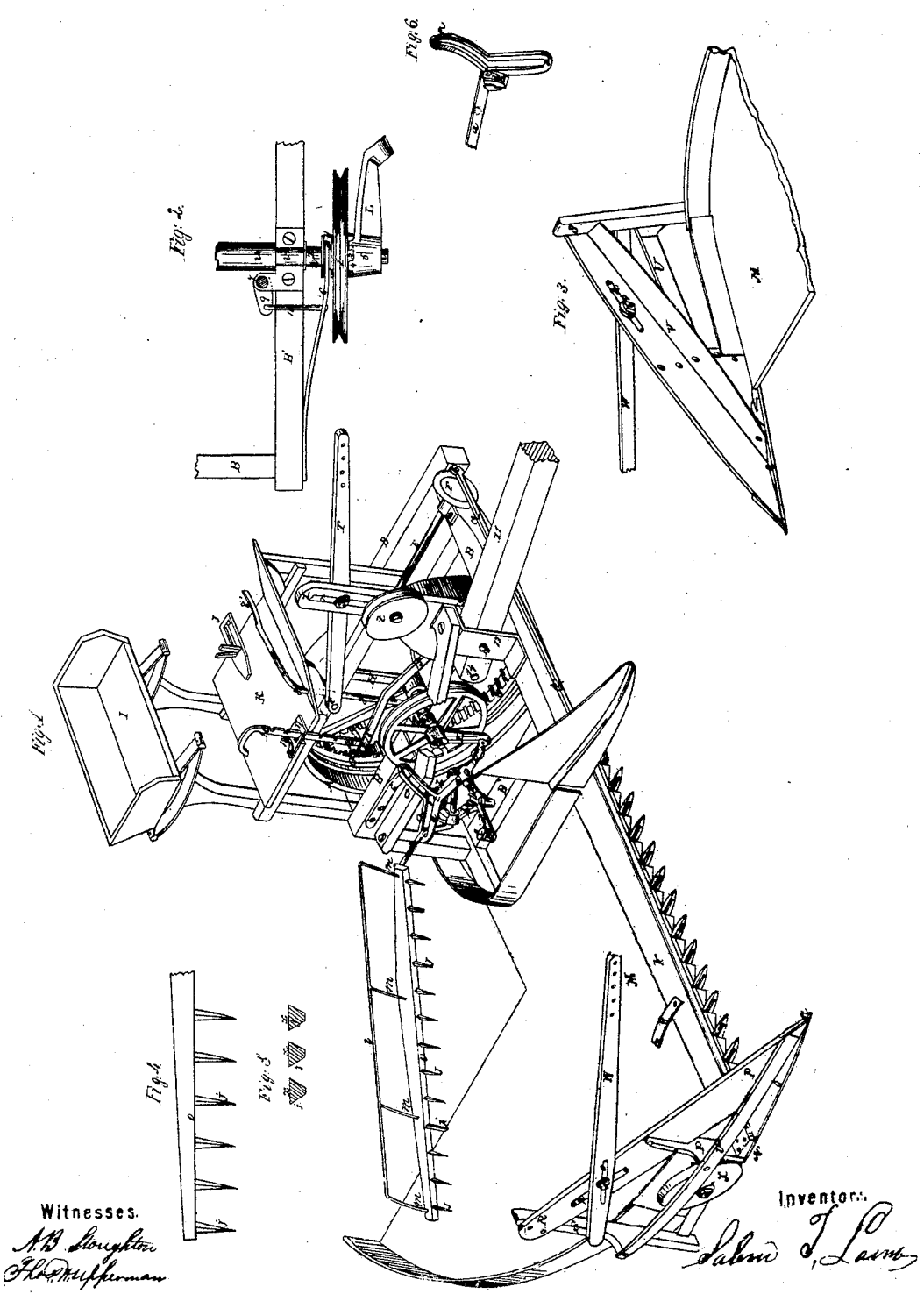
Witnesses.          Inventor.

UNITED STATES PATENT OFFICE.

SALEM T. LAMB, OF NEW WASHINGTON, INDIANA.

IMPROVEMENT IN HARVESTING-MACHINES.

Specification forming part of Letters Patent No. 30,330, dated October 9, 1860.

*To all whom it may concern:*

Be it known that I, SALEM T. LAMB, of New Washington, in the county of Clarke and State of Indiana, have invented certain new and useful Improvements in Harvesting-Machines; and I do hereby declare the following to be a full, clear, and exact description of the same, reference being had to the accompanying drawings, making a part of this specification, in which—

Figure 1 represents a perspective view of the entire machine. Figs. 2, 3, 4, 5, and 6 represent detached portions of the machine, which will be specially referred to hereinafter.

Similar letters of reference, where they occur in the separate figures, denote like parts of the machine in all of them.

My invention relates, mainly, to those parts of a harvesting-machine which divide and bring to the cutters the grain that is to be cut and deliver it onto the ground after it is cut, said parts consisting of the divider, the reel, and the rake; and it is to the construction and operation of these parts that my invention aims, and in which it consists.

To enable others skilled in the art to make and use my invention, I will proceed to describe the same with reference to the drawings.

A represents the main driving and supporting wheel of the machine, upon which the main frame B is balanced and supported.

C is a cogged rim on the main wheel, which drives a pinion, D, that is on the end of a shaft extending toward the left-hand side of the frame, (calling that part of the frame which is farthest from the standing grain the "left side" of the machine and the other the "right-hand side" thereof,) its opposite end carrying a bevel-gear wheel that drives a small bevel-pinion on the end of the shaft E. The forward end of the shaft E has upon it a crank-wheel, F, to which the pitman G, that drives the cutters, is attached.

The shaft that carries the pinion D and the bevel-gear above referred to has end motion in its bearings, and a lever, H, that is connected to said shaft, extends up toward the driver's seat I, and has its end forked or split, so as to form a spring, and passes through or into a catch-piece, J, on the foot-board, K. When the ends of the lever H are in the position shown in Fig. 1, the bevel-wheels are in gear. When it is moved to the other end of the slot in J, they are disconnected, and they are thus held in or out of gear, as may be required.

On the right-hand end of the axle of the main wheel A there is keyed, so as to turn with said axle, a crank, L, the wrist-pin of which, instead of being at right angles to the line of the crank, forms quite an acute angle with it. To this wrist-pin is connected a yoke or frame, *a a a*, which is pivoted also to a turning piece, *b b b*, supported by its journals in the pieces B' B" of the main frame.

*c c* is the shank of the rake. It is supported in the turning piece *b b b* and receives its motions therefrom. The rake and its operation are substantially the same as that patented to me on the 30th of June, 1857, and I do not propose to describe it in detail in this specification, but simply to mention the improvements which I have made upon it, so as to make it still more perfect in its operation. The motion of the rake is unchanged. The tendency of the rake sometimes (and particularly if the team be suddenly started up just as the rake is about to come upon the platform) is to strike the platform so as to batter the points of the rake-teeth, if of wood, and thus prevent their free entrance into and exit from the grain, and if of iron they batter and bruise the platform. This I obviate by the introduction of an elastic medium between the rake or its teeth, or both, and the platform or frame, which will receive the shock or fall of the rake, and thus cause it to move easily, freely, and with great regularity. On the supporting-piece *d*, I put a series of washers, *e*, and on top of the washers a piece of rubber or any other equivalent material that will ease off the fall of the rake-shank *c*. This support is adjustable by taking off or putting on some of the washers, and should be of such height as to allow the points of the rake-teeth to barely touch the platform without striking it. As an additional protection against the points of the rake-teeth striking the platform, I use a spring-plate, *g*, snugly let into the platform M and finger-beam N, and make the rake-tooth *h*, that strikes upon that point or part, of metal and with a blunt point, and a fraction longer than the other teeth, so that this special tooth and spring under it shall let the rake down easily upon the platform, however much the machine itself may be shocked or shaken in passing over the ground; and, if desired, another metal tooth and spring may be used near the heel of the rake. It is of course immaterial of what substance or material the medium that resists the shock is composed so long as the effect be produced.

The rake O, in sweeping off the platform, moves over the surface of it, and when it is to be returned for the next similar operation it must be raised up high enough so as not to interfere with the cut grain, or that which is falling upon the platform; and to prevent any sudden blow or jar in thus raising up the rake from a state of rest I insert an elastic lifting-piece, $i$, Fig. 6, where the slots of the frame $a$ meet, or where said frame comes in contact with the rake-shank, and thus interpose a yielding medium between the shank and the frame that operates the rake, so that it will not come up with a sudden shock.

The rake-teeth $j$, I make three sided, as shown in Fig. 5, and make the flat sides $x$ thereof come next the grain that is to be swept off, the object being to have a full surface next the grain and an enlarged space behind the open spaces between the rake-teeth, that will allow anything that can pass into said spaces to be immediately freed therefrom by the enlarged opening behind. This form of tooth, too, has great strength in proportion to its weight.

The rake-teeth $j$ have an inclination from the heel toward the point of the rake, the object being to counteract the forward motion of the machine and its tendency to cause the rake to hold onto the grain and dribble it along upon the ground. The delivery of the sheaf or gavel upon the ground implies a momentary stop to effect the object properly, but of course the machine cannot be stopped, and when the rake should let go the sheaf or gavel it has the forward motion upon it, although its circular motion has ceased. It is obvious that if the teeth inclined from point to heel of the rake, the heel going foremost, they would hold onto and carry the grain along with the machine and not deliver it in bundles at all. If they are perpendicular, they will hold on less long; but inclined, as I have them, they draw out of the grain, and do not carry the grain with them, and thus I deliver a compact bundle or gavel onto the ground. The wire guard $l$ on the rake-head I fasten by letting the wires $m$ into the side of, instead of into the top of, the rake-head. In this way they are less liable to get loose.

The outside divider I make as follows: P is an upright firmly bolted to the end of the finger-beam N, and from the under side of the finger-beam a shoe-piece, Q, extends forward and is fastened to the point $n$. To this same point is fastened a board, R, inclining upward and rearward, and supported by the brace P near its center, and by an upright, S, at its rear end, said upright being fastened to the platform-frame N. U is a bow on the outer part of the divider, extending from near the point of the divider, and fastened to both the uprights P S. On the inside of the board R there is an inclined ledge, V, which rises from the shoe-piece Q up to near the top of the upright S, its object being to turn the grain more onto the platform and within the influence of the rake. W is a reel-support. Its heel is fastened to the upright S, and where it passes the board R it and the board are both slotted, as at $o$ $p$, so that a clamp-screw, $q$, passing through both, allows the reel-support to be raised or lowered. X is the outside supporting-wheel. It is made adjustable, so as to raise up or let down the outside of the platform. T is the other reel-post. It is secured at $k$ to the piece Y, that forms a part of the foot-board support, and is supported at or near its center in a brace, Z, which has a slot, $r$, in it, so that by the screw-bolt $s$ said reel-post may be properly adjusted; and in this same slot, $r$, is arranged a tightening-pulley, $t$, for keeping the band that drives the reel sufficiently tight, said pulley being adjustable in its slot for this purpose.

The axle $u$ of the driving-wheel A is supported in a box, $v$, on the piece B' of the main frame, Fig. 2, and on the journal $w$ of this axle the hub $y$ of the pulley 1, that drives the reel, moves on a feather, 2, so that while the pulley may be slipped along upon the axle it will still continue to turn with it. The hub $y$ of the pulley 1 has a semi-clutch, 3, formed upon it, which takes into a similar semi-clutch, 4, on the hub 5 of the crank L, that drives the rake, the clutches being forced together and firmly held to each other by a stout spring, 6. The crank L is loose on the axle $u$; but when the clutch is acting it of course turns with the axle, being driven by the pulley 1, which constantly turns with the axle.

To the projection 7 on the journal-box $v$ is connected a vertical rod, 8, which carries upon its lower end an arm, 9, and the spring 6, that holds the clutch in gear, is connected to this arm 9 by a rod, 10. The rod 8 extends upward through the foot-board K, where it is bent around, as shown at 8', so that the driver with his foot may turn the rod 8 at pleasure. If it be desirable at any time to stop the operation of the rake, either to wait until a sufficient quantity of grain has accumulated on the platform to form a gavel, or for any other purpose, it is only necessary for the driver to force from him with his foot the lever 8', which draws the pulley 1 away from the crank L and disconnects the clutch. The consequence then is that while the pulley and the reel continue their motion the crank and rake cease to move, and when the driver removes his foot from the lever 8' the spring 6 throws in the clutch, and the rake and reel both move.

The tongue 11 is pivoted by a bolt, 12, in the guides 13, the rear end of said tongue being connected by a bolt, 14, to a lever, 15, by which said rear end may be raised or lowered at pleasure; but when raised or lowered to the proper point, then the tongue is rigid. By raising or lowering the rear end of the tongue I mean raising or lowering the machine by the tongue, the horses' necks, to which the tongue is attached, being the fulcra.

To the rear end of the lever 15 is attached a rod, 16, which extends up through the foot-board K, where it is bent back so as to form a handle that the driver can easily grasp in his hand. One edge of this rod is furnished with a series of notches which will straddle and hold on a catch-plate, 17, on the foot-board, said notched edge being forced up against the catch-plate by a stationary spring, 18, attached to the foot-board. To raise or lower the machine the driver draws the rod 16 toward his seat. This releases it from the catch-piece. He then raises or lowers the rod to the proper point, and lets go the rod. The spring 18 throws the rod against the catch-plate, and it is permanently held there.

I am aware that a traveling spring has been used in connection with a raising and lowering lever, but do not know that a stationary one has been so used. The former requires to be moved by hand to release the lever; mine need not be touched, and is therefore far preferable to the moving spring.

The rake-support $d$, with its adjusting-spring $e$ and cushion $f$, travels with the rake, and hence the friction that arises between traveling rakes and stationary guides or supports, as heretofore used, is entirely avoided by my plan of causing the support to travel with the rake.

Having thus fully described my invention, what I claim therein is—

1. In combination with the pulley and crank and the semi-clutches formed thereon, and the spring for holding them together, the several devices that enable the driver from his seat to unclutch them for the purposes stated, said devices being arranged substantially as herein described.

2. In combination with an automatic rake, the making of the rake-teeth three sided, and presenting one of the sides thereof to the grain, when said teeth are inclined on the rake-head from its heel toward its point, for the purpose of allowing the rake to clear itself from the grain, substantially as described.

3. In combination with a sweeping rake such as represented, the interposing of the springs $f$ and $g$ (the former traveling with the rake and the latter stationary on the platform) between the rake and the part or point upon which it drops, when said springs are so arranged as not to retard the movement of the rake by their recoil, and so that the raising or lowering of the rake shall not be injuriously affected by any sudden jarring of its parts, but have a free and easy movement, as herein described and represented.

4. In combination with a traveling rake, the traveling support $f$, substantially as and for the purpose specified.

5. The outside divider, having upon it the four lines Q R U V, when said parts are united to each other and to the finger-beam and platform by the uprights P S and form a support for the reel-post W, all as herein described and set forth.

6. Making the rake-teeth three sided and presenting the flat sides of said teeth to the grain, for the purpose of lightness and strength, and particularly for allowing the teeth to clear themselves of anything that may pass in between said teeth, as herein described.

7. Inclining the rake-teeth from the heel toward the point of the rake, to allow them to easily draw out of the grain and not hold onto it, as the forward motion of the machine would naturally cause it to do, and dribble it along on the ground, as herein described.

8. In combination with a sweeping rake such as represented, the interposing of the springs $f\,g$ (one traveling, the other stationary) between the parts which raise up the rake and the rake itself, or between the rake and the part or point upon which it drops when said springs do not retard the movement of the rake by their recoil, and so that the raising or lowering of the rake shall not be injuriously affected by any sudden jarring of the machine, but have a free and easy movement; and this I claim whether the cushion, spring, or other elastic medium be used for dropping the rake only, or for both raising and dropping, as herein stated.

9. In combination with a traveling rake, a traveling support, substantially as and for the purpose described.

SALEM T. LAMB.

Witnesses:
A. B. STOUGHTON,
THOS. H. UPPERMAN.